(No Model.) 9 Sheets—Sheet 1.
R. DINSMORE.
MAGAZINE FIREARM.
No. 601,708. Patented Apr. 5, 1898.
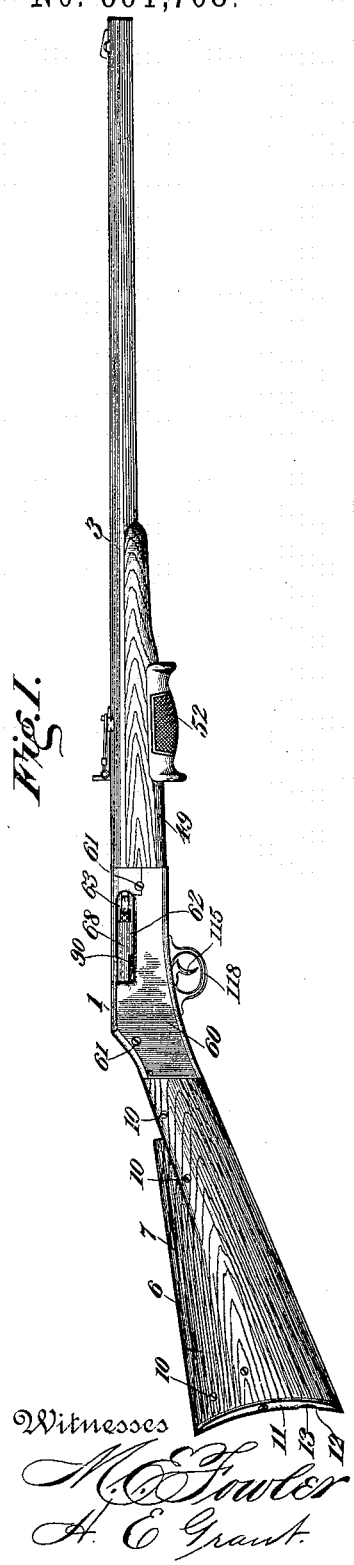
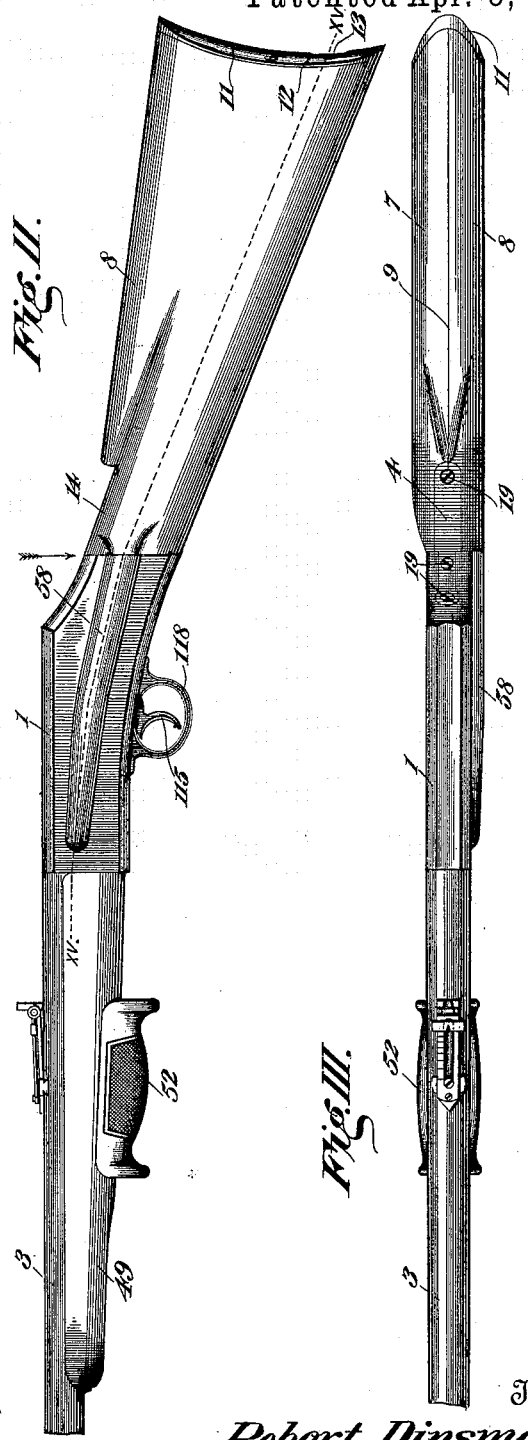
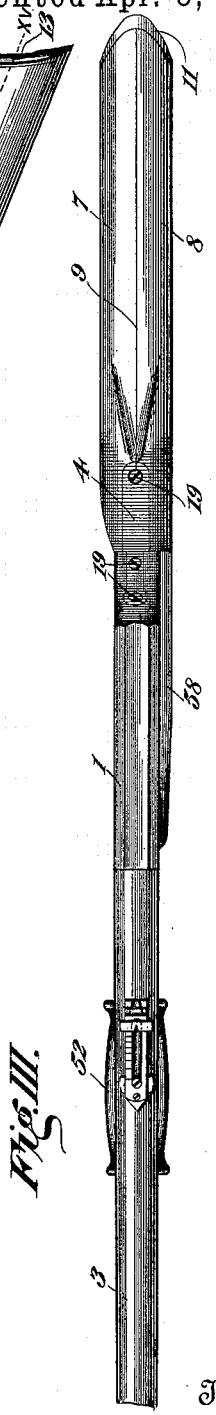
Witnesses
M. E. Fowler
H. E. Grant
Inventor:
Robert Dinsmore,
By Joseph L. Atkins
Attorney.

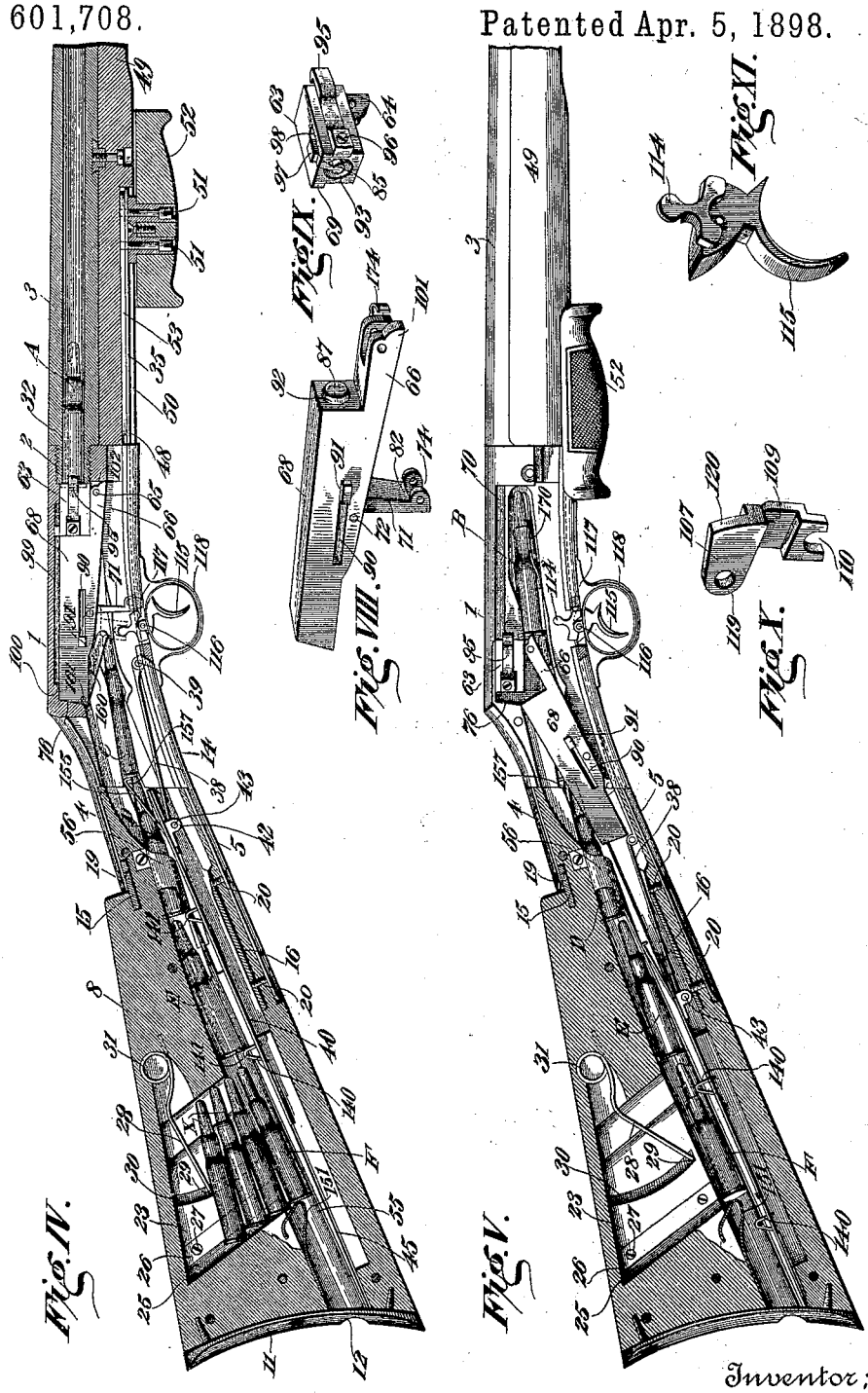

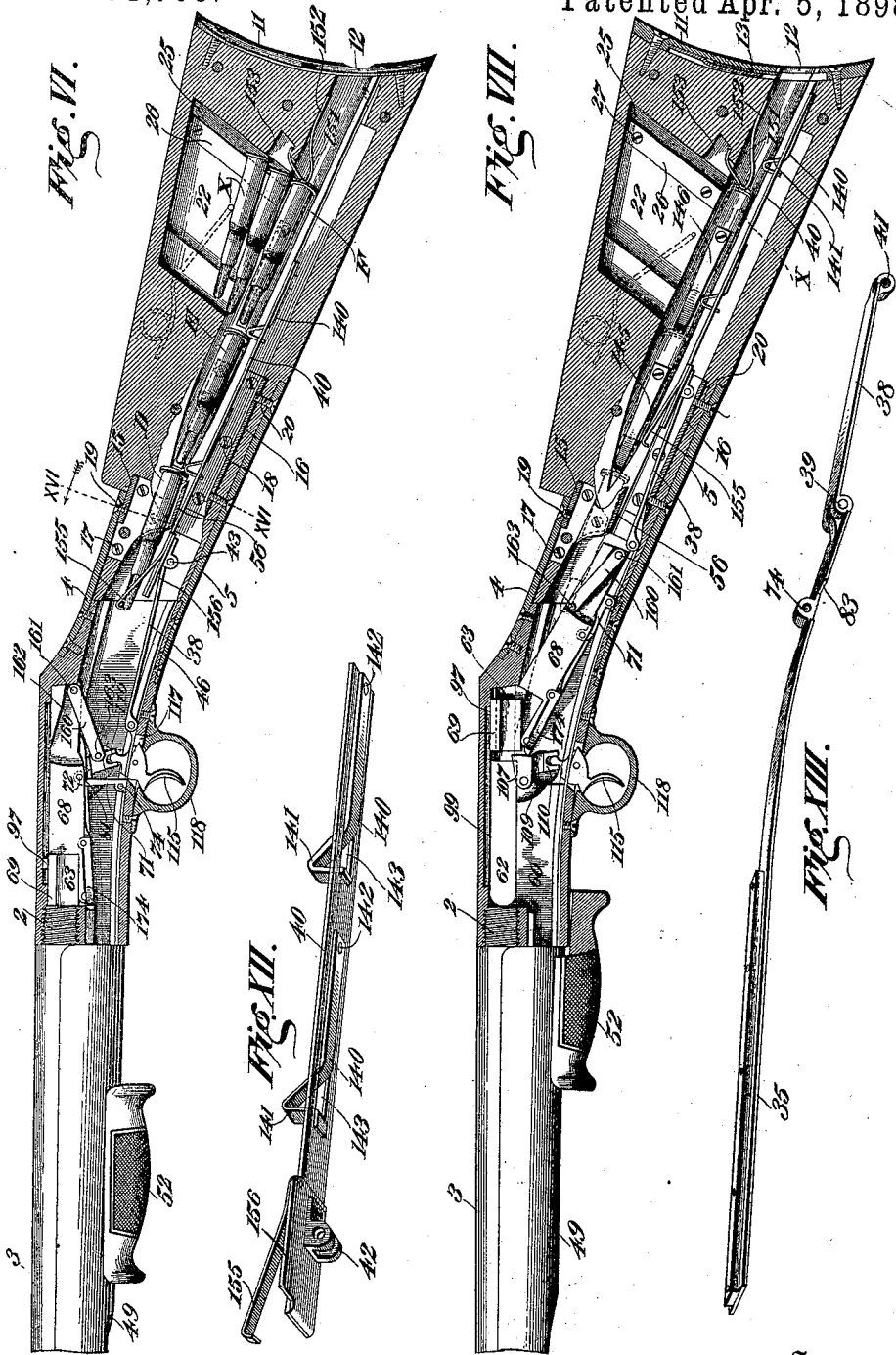

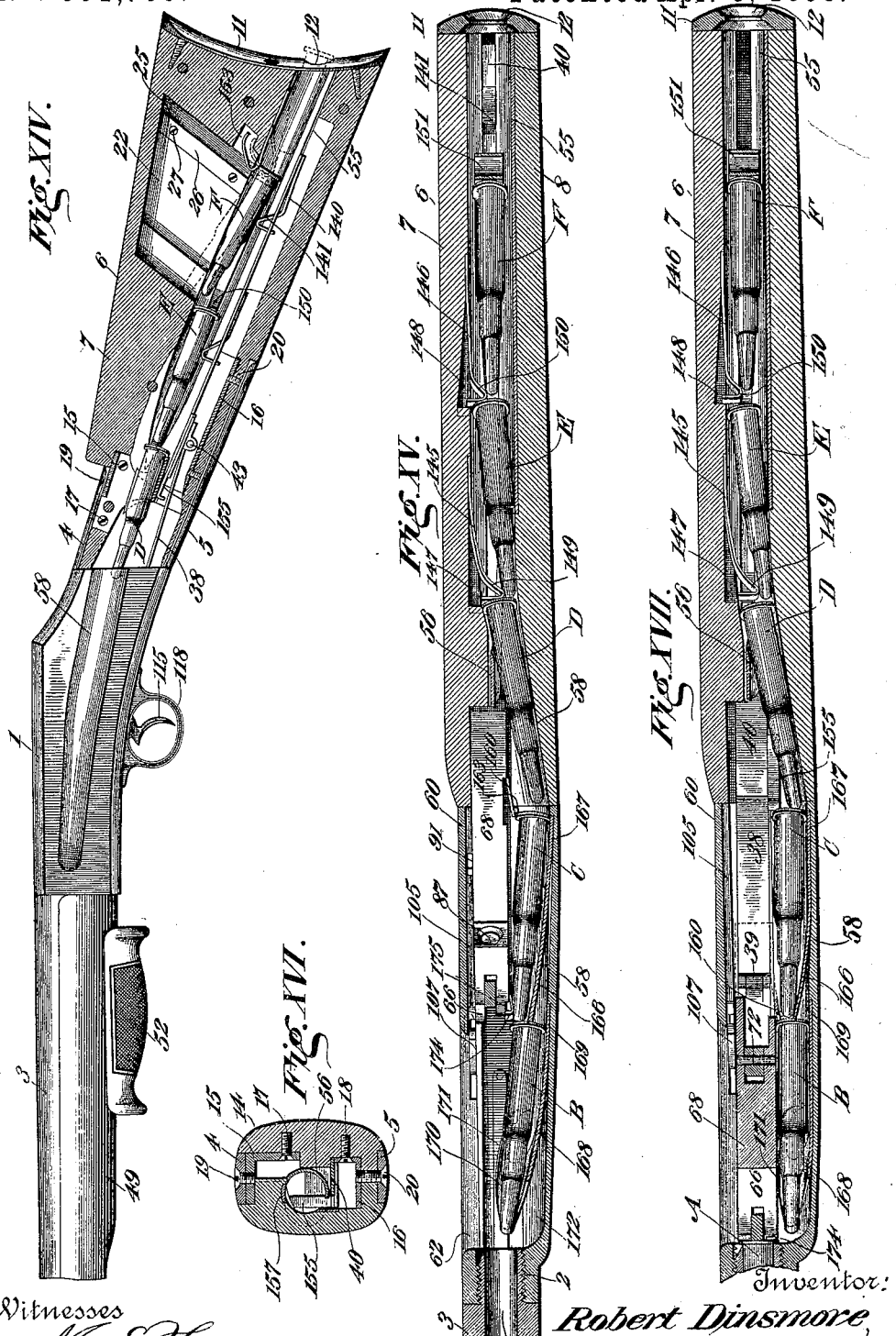

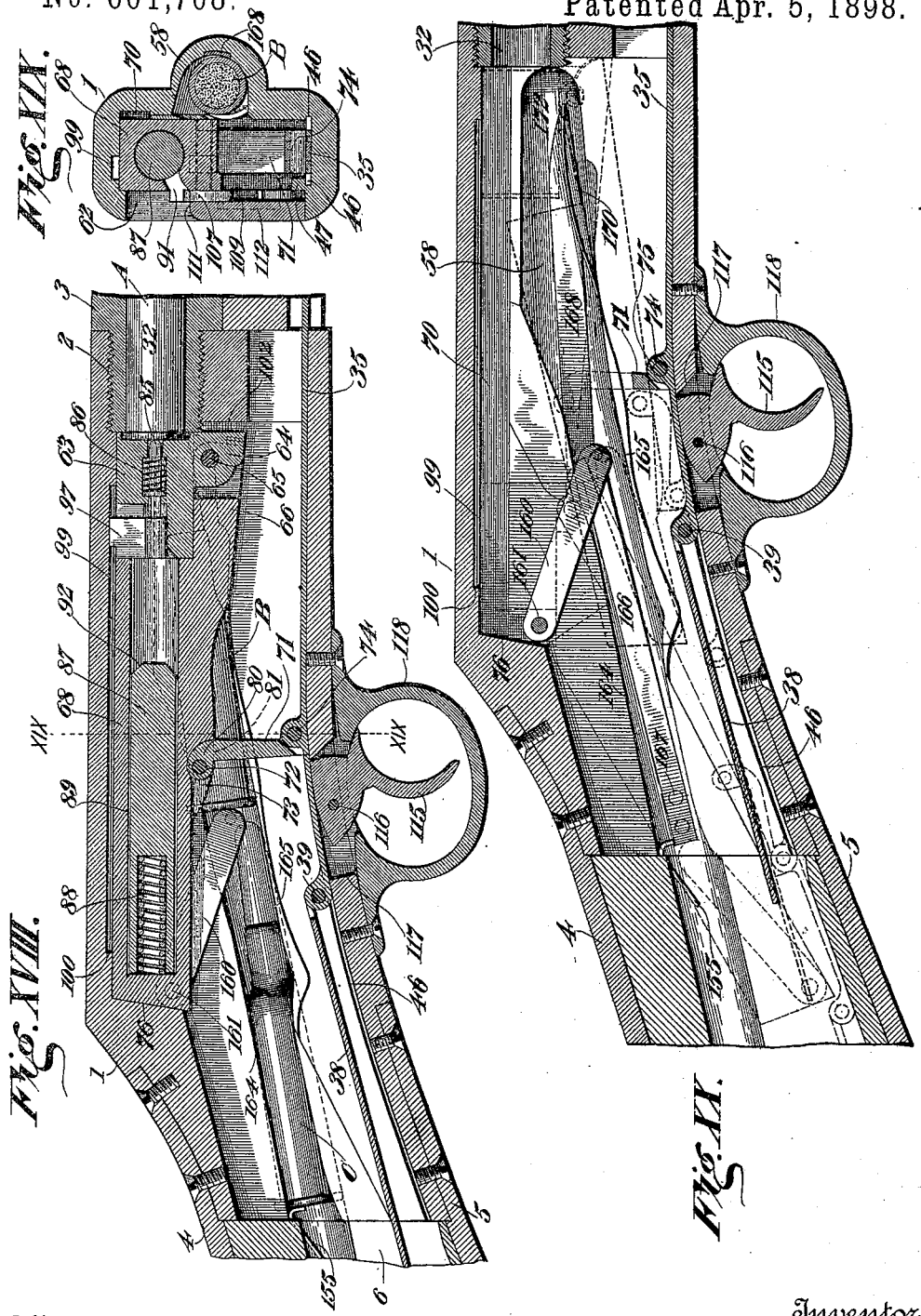

(No Model.) 9 Sheets—Sheet 6.
R. DINSMORE.
MAGAZINE FIREARM.
No. 601,708. Patented Apr. 5, 1898.
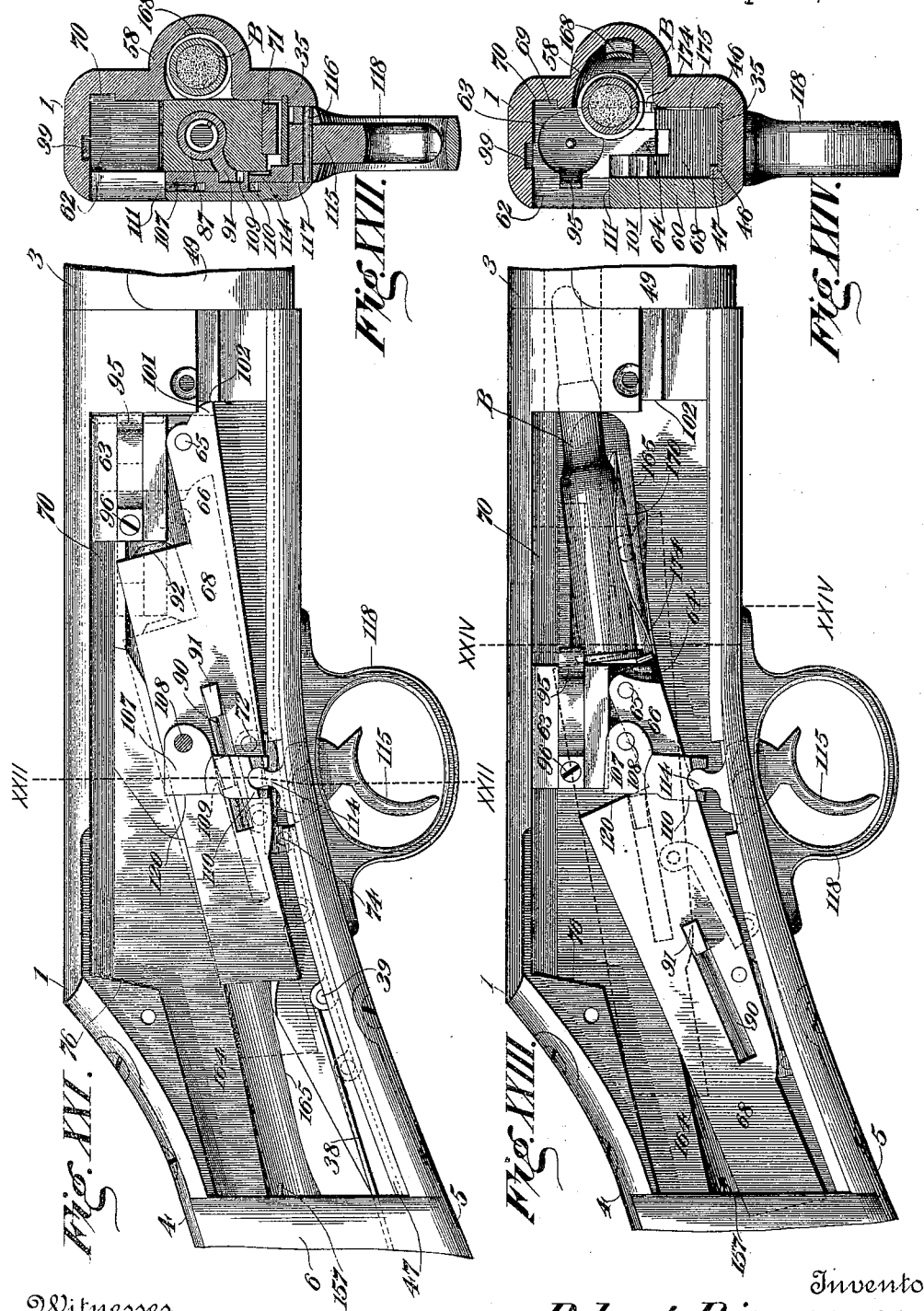
Witnesses
M. E. Fowler
H. E. Grant
Inventor:
Robert Dinsmore
By Joseph L. Atkins
Attorney.

(No Model.) 9 Sheets—Sheet 7.
R. DINSMORE.
MAGAZINE FIREARM.
No. 601,708. Patented Apr. 5, 1898.
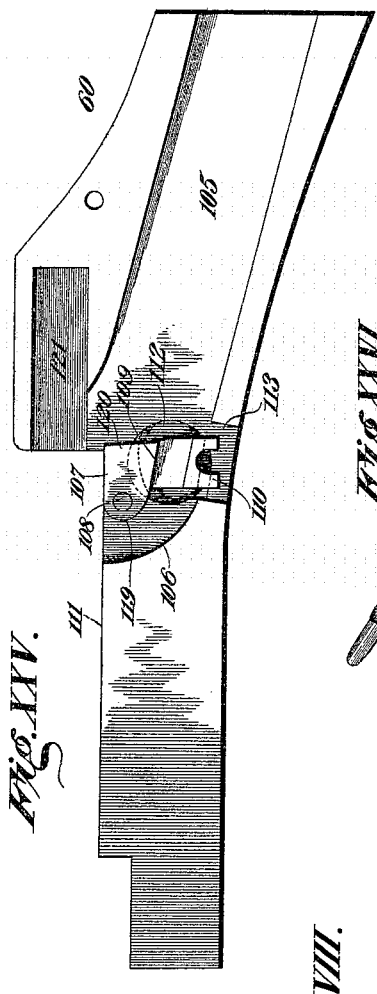
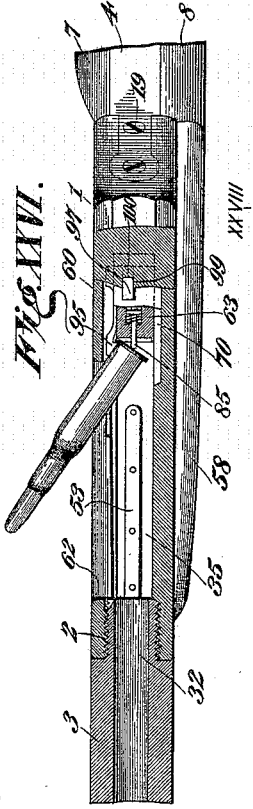
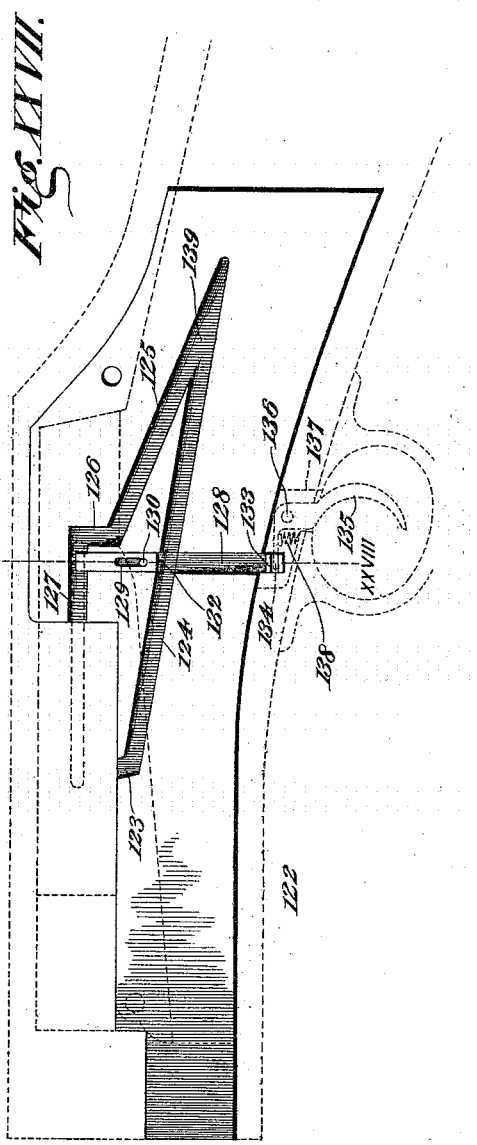
Witnesses
M. E. Fowler
A. E. Grant
Inventor:
Robert Dinsmore
By Joseph T. Atkins
Attorney.

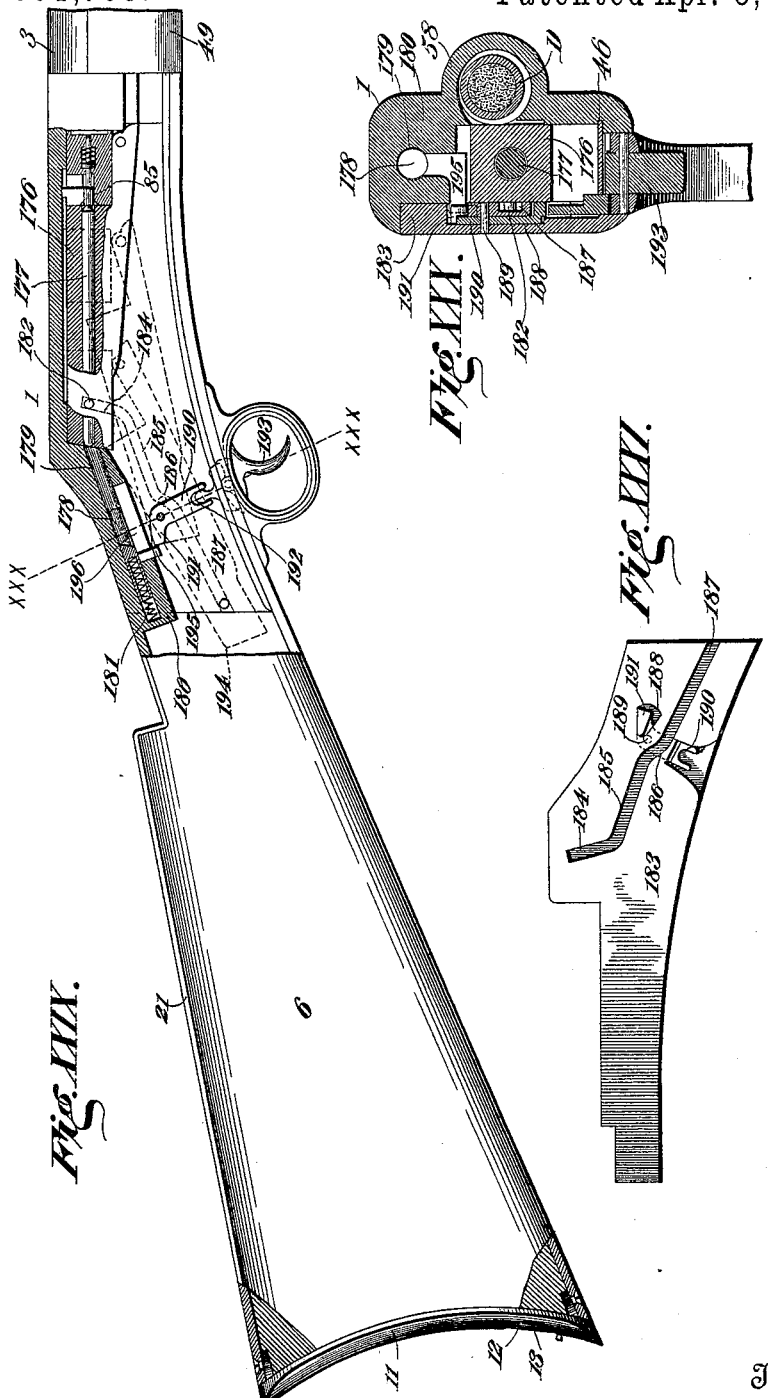

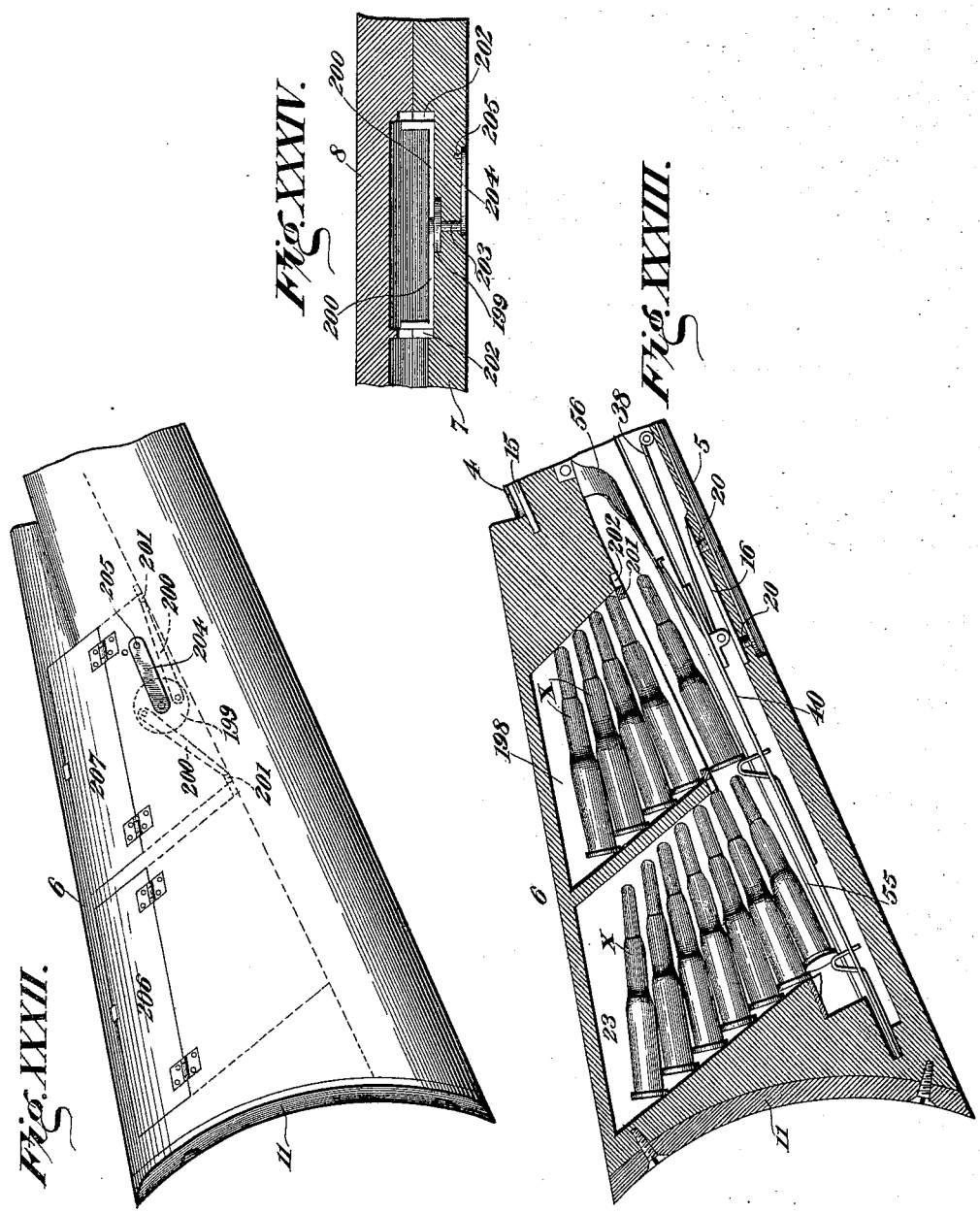

UNITED STATES PATENT OFFICE.

ROBERT DINSMORE, OF PASSAIC, NEW JERSEY, ASSIGNOR OF THREE-FOURTHS TO CHARLES B. DUNN AND PAUL R. LEFFERTS, OF SAME PLACE, AND PAUL R. VAN MATER, OF WASHINGTON, DISTRICT OF COLUMBIA.

MAGAZINE-FIREARM.

SPECIFICATION forming part of Letters Patent No. 601,708, dated April 5, 1898.

Application filed March 16, 1897. Serial No. 627,880. (No model.)

*To all whom it may concern:*

Be it known that I, ROBERT DINSMORE, of Passaic, in the county of Passaic, State of New Jersey, have invented certain new and useful Improvements in Firearms, of which the following is a complete specification, reference being had to the accompanying drawings.

The object of my invention is to produce improvements in firearms, particularly of the magazine repeating type, whereby the means and method of operation are materially simplified, the number of operative parts is reduced, the strength and durability of the gun are increased, the facility and accuracy of performance of its several functions are perfectly insured, and rapidity, coupled with absolute safety from accident in firing under all conditions, is secured.

Positive means for ejecting empty shells is provided by my present invention as well as means for reloading without the aid of the magazine; but those are but instances of numerous details which are comprehended within the scope of my invention and which, having been described in detail in the specification, will be succinctly pointed out in the appended claims.

In the accompanying drawings, Figure I is a side elevation of the gun complete. Fig. II is a similar view, somewhat enlarged, of a portion of the gun, showing the reverse side thereof. Fig. III is a top plan view of the subject-matter of Fig. II. Fig. IV is a central longitudinal sectional view, enlarged, of a portion of the gun loaded, showing the parts in position ready for firing. Fig. V is a view similar to Fig. IV, partly in elevation, showing the locking-block and cartridge-carrier at the limit of their rearward movement. Fig. VI is a view similar to Fig. IV, looking toward the opposite side of the gun. Fig. VII is a similar view to Fig. V, looking toward the opposite side of the gun. Fig. VIII is a detail perspective view of the locking-block detached. Fig. IX is a detail perspective view of the breech-block detached. Fig. X is a similar view of the sear. Fig. XI is a similar view of the trigger. Fig. XII is a perspective view of the feed-slide. Fig. XIII is a similar view of the actuating portion of the feed-slide. Fig. XIV is a side elevation of a portion of the gun, enlarged, showing the stock in section and the parts in position for filling the magazine. Fig. XV is a longitudinal sectional view on the line XV XV of Fig. II, the parts being in the position shown in Fig. V. Fig. XVI is a vertical transverse sectional view on line XVI XVI of Fig. VI. Fig. XVII is a view similar to Fig. XV, showing the parts in the position shown in Fig. IV. Fig. XVIII is an enlarged longitudinal vertical sectional view of a portion of the gun, showing the breech-block locked in position by the locking-block. Fig. XIX is a vertical transverse sectional view on the line XIX XIX of Fig. XVIII. Fig. XX is a view similar to Fig. XVIII, showing the locking-block and breech-block in dotted lines in several different positions and the swinging feeder on the locking-block in full lines. Fig. XXI is an enlarged side elevation of a portion of a gun with the side frame-plate removed, showing the locking-block at the limit of its initial downward movement from the locking position and the plunger-stud in alinement with the groove in the inside of the sear, the latter being shown in full lines, and in dotted lines showing a slight rearward movement of the locking-block and breech-block and the plunger-stud within the groove in the sear. Fig. XXII is a vertical transverse sectional view on the line XXII XXII of Fig. XXI. Fig. XXIII is a view similar to Fig. XXI, showing in full lines the locking-block slightly advanced from the limit of its rearward movement, as shown in Fig. V, the spring on the front edge of the locking-block about to retire from the heel of the cartridge, and in dotted lines the plunger-stud engaging the edge of the sear above its groove preparatory to cocking and the breech-block squarely abutting against the base of the cartridge. Fig. XXIV is a vertical transverse sectional view on the line XXIV XXIV of Fig. XXIII. Fig. XXV is an inside elevation of the side plate detached. Fig. XXVI is a detail longitudinal sectional view showing the manner and means of ejecting a cartridge. Fig. XXVII is a detail elevation of the side plate, showing a modified form of plunger-stud, groove, and sear. Fig. XXVIII is a vertical transverse sectional view on line XXVIII XXVIII of Fig. XXVII. Fig. XXIX is a side elevation of a portion of a gun, showing a modified form in which the plunger and sear, being located farther in the rear than is shown in the previous figures, are modified to accommodate them to their change of location, a portion of the gun-frame being removed to exhibit the arrangement of the interior parts. Fig. XXX is a transverse section on the line XXX XXX of Fig. XXIX. Fig. XXXI is an interior elevation of the side plate and sear of the modified form shown in Fig. XXIX. Fig. XXXII is a side elevation of a portion of a stock, showing the compound form of magazine-chamber. Fig. XXXIII is a longitudinal section thereof. Fig. XXXIV is a transverse section of the auxiliary chamber, showing the cartridge-supporting mechanism thereof.

Referring to the figures on the drawings, 1 indicates that portion of my gun which I shall call the "frame," consisting, as it does preferably, of a single metallic casting, to which, at its forward end, is secured, as usual, as by screw-threads 2, (see, for example, Fig. IV,) a barrel 3, and at its rearward end, as by extensions 4 and 5, for example, the stock 6. The stock is preferably, but not necessarily, composed of two halves 7 and 8, the plane of division being clearly shown in Fig. III by the line 9. The two halves of the stock may be united, as by transverse screws 10, and are finished by a butt-plate 11, that may be provided with the ordinary feed-aperture 12, that may be opened and closed by means of a sliding shutter 13.

To provide for firmly and rigidly uniting the two-part stock to the frame, I secure to one of the parts—as, for example, the part 7—just below the grip 14 opposite angle-plates 15 and 16, respectively. Each of the angle-plates is secured, as stated, to one part of the stock, as by screws 17 and 18, respectively, and the plates are in turn firmly fastened to the extension-pieces 4 and 5, respectively, as by machine-screws 19 and 20. By this means a rigid union between the one-half of the stock and the frame is effected, in consequence whereof when the other side of the stock is united to it by the screws 10 the two parts constitute a rigid and compact whole.

The stock may be made in the manner previously described or in any other suitable manner—as, for example, upon a skeleton-frame extension 21, as shown in Fig. XXIX—the object being to secure means for providing within the stock a magazine-chamber and mechanism for feeding cartridges from the magazine-chamber to the cartridge-chamber in the breech of the barrel, as required.

In order to provide the magazine-chamber within that form of embodiment of stock shown in the figures, except Fig. XXIX et seq., I provide in each of the pieces 7 and 8 recesses 22 and 23, respectively. The recesses should be of suitable altitude and length to accommodate a predetermined number of cartridges and when united should be of sufficient width collectively to receive a cartridge of the required caliber between them. Each of the recesses is preferably provided with a transverse groove 25, whose forward edge is preferably defined by a metallic strip 26, secured in place, as by screws 27. The oppositely-located grooves 25 are designed in practice to retain and loosely guide the heels of the cartridges contained within the magazine-chamber.

Within one of the recesses, which when united constitute the magazine-chamber—as, for example, the recess 23—I provide an arm 28, whose bent end 29 is adapted to travel within the segmental groove 30, it being yieldingly urged toward the bottom or discharge end of the magazine-chamber, as by a coiled spring 31, which may be made integral with the arm. The end of the arm beyond the spring may be inserted into the material of the stock, as shown in Figs. IV and V. The office of the spring-actuated arm 28 is to keep the cartridges collectively urged toward the discharge end of the magazine-chamber and to prevent them from rattling while in place within the same.

Guns of the type to which my invention belongs require means for feeding cartridges one by one from the magazine-chamber to the cartridge-chamber 32 in the breech of the barrel. The means which I employ consists, preferably, of a flexible feed-slide, which consists of a forward section 35, an intermediate section or link 38, pivoted to the section 35, as indicated at 39, and a terminal or cartridge carrier-section 40. The link 38 is preferably provided with a knuckle 41, that fits between a pair of lugs 42, secured to the under side of the carrier-section of the feed-slide near its forward end, as by means of a pintle 43.

The details of the forward sections of the flexible feed-slide are clearly illustrated in Fig. XIII of the drawings, and those of the carrier-section thereof are in like manner illustrated in Fig. XII.

The carrier-section of the feed-slide moves within opposite parallel grooves 45, provided for it in the parts 7 and 8 of the feed-stock. Those grooves may be clearly seen by comparing, for example, Figs. IV and VI of the drawings. The forward portion 35 works within opposite grooves 46, defined in the side wall of the frame 1 and in a rib 47 on the interior side of the lower wall of the frame 1. These grooves, as may be clearly understood by reference to Figs. XVIII to XXIV of the drawings, extend the entire length of the frame and aline at the forward end thereof with corresponding grooves 48 in the front extension 49 of the stock.

Below the portion 35 of the feed-slide, in the lower wall of the front extension 49 of the stock, is provided a narrow oblong aperture 50, through which, as by means of screws 51, a hand-grip 52 is operatively secured to the part 35, that part being provided with a thickened rib 53 to lend rigidity to it at its forward end. By means of the hand-grip 52 the feed-slide throughout its entire length may be reciprocated by operating the hand-grip in the usual manner.

Although it is one of the objects of the feed mechanism to advance the cartridges from the magazine-chamber to the breech-chamber 32, yet in my gun it is so intimately connected with the mechanism which adjusts and delivers the last cartridge of the series into the breech-chamber preparatory to firing and to the firing mechanism that I deem it conducive to clearness to proceed, after briefly referring to the course pursued by the cartridges from the magazine-chamber to the breech-chamber, to describe the mechanism which actuates the last cartridge of the series, reserving to a later portion of the specification the detail description of the mechanism by which the cartridges are conducted one by one from the magazine-chamber to the breech-chamber. Proceeding accordingly, therefore, reference may be had especially to Figs. XV, XVI, and XVII of the drawings, in which the preferred course pursued by the series of cartridges from the magazine-chamber to the breech-chamber is illustrated.

I prefer to provide for the purpose specified within the stock and the frame a clearly-defined passage through which the cartridges are impelled with a step-by-step movement. The passage is more or less of skeleton form within the stock, being defined by a partially-cylindrical plate 55 in the part 8 of the stock, which is more accurately defined at its forward end by a partially-cylindrical deflecting-plate 56. The form of the deflecting-plate 56 may be clearly understood by comparison of Figs. IV to VII, inclusive, with Fig. XVI of the drawings. It is also illustrated in Figs. XV and XVII, and in the latter figure its office as a deflecting-plate may perhaps be more clearly apprehended, that office being to guide the series of cartridges to a deflected channel 58 in the frame 1, that constitutes the forward portion of the cartridge-passage.

As will hereinafter appear, each cartridge as it advances from the magazine-chamber to the breech-chamber is successively operated upon by separate and in a measure independent groups of mechanisms, and for that reason I deem it expedient to assign to each of the cartridges shown in Figs. XV and XVII a separate reference-letter, it being understood that a reference-letter as contradistinguished from a numeral wherever found indicates a cartridge and that a particular letter will indicate the position in the series, as completely illustrated in Figs. XV and XVII. Accordingly A indicates the breech-chamber cartridge or that one completely introduced into the breech-chamber; B, the next one in series; C, the next; D, the next; E, the next; F, the last of the series within the passage, (see Fig. V,) and X any of the number outside of the passage or in the line of direct advancement, but confined within the magazine-chamber. (See Figs. IV and VI.)

The gun-frame 1 is essentially a hollow or chambered piece, fashioned to accommodate the internal mechanism of the gun, and is provided on one side with a removable side plate 60, (see Fig. I,) which, being secured in place, as by screws 61, constitutes a removable wall for the side of the frame opposite the channel 58, the frame being otherwise, as previously specified, of one piece.

The side plate 60 completely closes the side of the frame upon which it is located, with the exception of a cartridge-ejecting aperture 62, which, communicating with the interior of the frame, is of such dimensions as to permit the ejection through it of a cartridge or cartridge-shell, as required.

Referring, in the first place, particularly to Figs. IV, VI, and XVIII, in which the parts about to be referred to are shown in the position ready for firing, 63 indicates a breech-block, (illustrated in detail detached in Fig. IX,) to which, as upon a depending lug 64, as by means of a pintle 65, are pivoted the sides of the bifurcated forwardly-projecting end 66 of a locking-block 68. The breech-block is provided upon one side, next to the channel 58, with a projection 69, (see Figs. VI and VII,) which, working within a groove 70 in the side wall of the frame, (see Figs. V and XXI to XXIV, for example,) serves, when the breech-block is confined in place by the side plate 60, to guide the breech-block in its reciprocation in direct axial alinement with the barrel 3. The breech-block derives reciprocating movement from the movement of the locking-block, which is in turn actuated by the movement of the feed-slide, being secured thereto, as by a link 71, that is pivoted at one end, as indicated at 72, within a recess 73 to the locking-block and at the other end, as indicated at 74, to a knuckle 75, projecting from the upper face of the feed-slide 35.

The locking-block and breech-block are designed and constructed so as to completely fill, when in place, the space between the breech end of the barrel 3 and the end of the frame 1, defined by a preferably oblique wall 76.

The frame 1, which embodies the abutment-wall 76, is constructed solidly and of comparatively heavy material, in order, through the interposition of the breech and locking blocks between it and the cartridge, to insure safety in the employment of cartridges containing the most powerful explosives. With the same object in view the relationships between the link 71 and the locking-block and feed-slide, respectively, are so arranged as to cause the link, when the locking-block is in place in firing, to occupy the substantially vertical and immovable position illustrated in Fig. XVIII, so that this connection between the cartridge-feed mechanism and the locking-block serves to lock or hold the latter firmly in place. The construction of these parts is also such that when the breech and locking blocks are moved back the locking-block and link 71 fold down close to the cartridge-feed devices, thus permitting the parts to be mounted and operated in a small space. In this connection by reference to the figure last mentioned it may be noted that the link 71 has an extensive curved head or upper part 80, which fits snugly into a corresponding socket in the locking-block, and also a shoulder 81, resting against the locking-block, and that its lower end 82 (see Fig. VIII) extends through recesses 83 (see Fig. XIII) in the feed-slide. By this means the full strength of the link 71, which is made thick and heavy, is interposed directly between the locking-block and the lower wall of the frame 1 and depends upon the pintles 72 and 74, respectively, solely for guidance during the operation of the parts and not for support in forcing the locking-block into its position between the breech-block and the abutment-wall 76.

It is by means of the mechanism described that I secure the cartridge in the breech-chamber by a rigid mass of metal incorporated substantially with the body of the frame itself.

It will be observed that the breech and locking blocks when moved back from the barrel travel in a plane which is, in the form of the invention shown, a vertical plane cutting through the barrel longitudinally—that is, substantially at right angles to the plane in which the deflected portion of the cartridge-passage is situated and which, as shown, is a horizontal plane cutting longitudinally through the barrel. This construction permits the cartridges to be delivered from the stock to the barrel in that type of gun in which there is a breech and a locking block reciprocating within the gun-frame.

The breech-block 63 (see Fig. IX) is provided with a firing-pin 85, actuated by a coiled spring 86. (See Fig. XVIII.) The firing-pin is in axial alinement with the plunger 87, actuated by a coiled spring 88. The plunger works within a longitudinally-disposed chamber 89 in the locking-block 68. From one side of it projects through the wall, through a slot 90, a plunger-stud 91. The stud 91 is employed in practice to compress the spring 88, and the length of the slot 90 limits the forward movement of the plunger 87. The plunger serves, when impelled by the force of the spring 88, to deliver a blow against the end of the firing-pin 85, which in turn strikes the cap of a cartridge confined within the breech-chamber.

The forward end of the plunger 87 is conical in form, as indicated at 92, and the adjacent end of the breech-block 63 is provided with an inversely-conical depression 93, which, being concentric with the firing-pin 85, is adapted to receive the conical end 92 of the plunger.

The breech-block 63 is provided with a spring hook or catch 95, which, being firmly secured in place, as by a screw 96, (see Fig. IX,) is adapted when the breech-block is forced in place behind a cartridge to engage the rim or heel of the cartridge, so as to withdraw the cartridge or an empty shell after firing from the breech-chamber. In connection with that or other suitable means for engaging the rim of the cartridge I employ a positively-movable ejecting member, located to one side of the rim. The firing-pin 85 fulfils the condition as to location, which, although located concentric with the shell, is nevertheless eccentric with respect to the rim. I therefore adapt the firing-pin as the ejecting member by providing upon one side of it a lug or extension 97, that works in a slot 98. (See Fig. IX.) The slot 98 is for convenience located in the top of the breech-block 63, and, as shown in Fig. XVIII, the lug 97 works in a groove 99 in the inner side of the upper wall of the frame. The slot 98 serves to limit the forward movement of the firing-pin 85 under all conditions.

As previously specified, the breech-block is adapted to reciprocate within its groove 70 in axial alinement with the barrel 3. Consequently as it approaches the rearward limit of its travel the edge of the lug 97 within the groove 99 strikes the end or stop-shoulder 100 of the groove and by a positive movement impels the firing-pin 85 against the end of the cartridge or shell, thereby causing it to turn with great force at the point where it is confined by the hook 95 and ejecting it through the ejecting-aperture 62. (See Fig. XXVI.)

I have inserted at this place the description of the cartridge-ejecting mechanism because it serves to explain one of the conditions upon which the initial downward movement of the locking-block in a measure depends—that is to say, when the cartridge is in the breech-chamber and the hook 95 on the breech-block 63 is forced into engagement with its rim or heel the breech-block is securely attached to the cartridge, so as to insure the withdrawal of the cartridge through the rearward movement of the breech-block.

Now the fit of the cartridge within its chamber is in practice, especially after the explosion of a shell, so close as to require some force to extract the shell. It is apparent that the first movement of the locking-block 68 from the position which it occupies, as shown in Fig. IV, for example, must be downwardly, no rearward movement being, in the first place, possible. The limit of the initial downward movement is shown in Fig. XXI of the drawings. From the position shown in Fig. IV, for example, to that shown in Fig. XXI the movement of the locking-block is made entirely upon the pintle 65. I avail myself of this initial movement to start the cartridge or shell from its chamber. To accomplish this, I provide a fulcrum extension 101 upon one side of the bifurcated end 66 of the locking-block 68, (see Fig. VIII as to details of construction,) bearing against an abutment-face 102 on the forward end of the frame, so that the locking-block in turning upon the pintle 65 as a pivot secures a leverage through the engagement of the fulcrum extension 101 against the abutment-face 102 to loosen the cartridge or shell from the chamber. After it is loosened the shell requires no material force to completely withdraw it from the breech-chamber.

The locking-block in making its descent from the position shown in Fig. IV to that shown in Fig. XXI makes the first movement preparatory to cocking. I shall therefore proceed to describe the mechanism by which the plunger 87 is employed to compress the spring 88 to hold it in place until the gun is to be discharged and for its release when the discharge of the piece is to be effected.

The practical efficiency of my gun requires that its operation should be accurate and rapid in action—that is to say, that with each complete reciprocation of the hand-grip 52 all the functions necessary to the ejectment of an empty shell, the reloading, and the cocking of the gun should be completed. For that reason I propose to employ in the present connection suitable mechanism which shall at the expense of the least possible force during the forward movement of the feed-slide provide for the cocking of the gun—that is to say, the compression of the spring 88 and detention of the plunger 87.

As shall hereinafter be specified, the locking-block in its downward and rearward travel performs distinct functions as a component part of the magazine feed mechanism; but at present it is to be considered solely as to its operation in compressing the spring 88 and detaining the plunger preparatory to firing the piece.

The operation under consideration is substantially accomplished in the manner illustrated in full lines in Figs. XVIII and XXI to XXIII, inclusive, of the drawings. The last rearward and downward movement of the locking-block, in which it proceeds from the position shown in Fig. XXIII to that shown in Fig. V, for example, is designed for performance of functions independent of the cocking function. For that reason I shall refer especially to the figures enumerated. Let it be borne in mind in this connection that the plunger-stud 91 upon the locking-block 68 should be unimpeded in its progress during the rearward travel of the locking-block, that it should be caught and forced to the rear of the slot 90 during the ascending movement of the locking-block, and that it should be detained in the position last specified, which represents the cocked position, as shown in Fig. XVIII, until the piece is to be fired.

As preferred means for accomplishing the objects referred to in the foregoing paragraph I provide suitable mechanism upon the inner face of the side plate 60, and show two modified forms of embodiment of mechanism for the purpose. The preferred form of side plate is illustrated in Fig. XXV and the modified form in Fig. XXVII. I also show a still further modified form in Figs. XXIX to XXXI of the drawings; but as those figures illustrate the change of location of several of the parts, rather than a mere modification of the side plate, I shall reserve description of the subject-matter of the last-named figures to a subsequent part of the specification.

The preferable form of side plate (illustrated in detail in Fig. XXV) is provided on its inner face with a somewhat extensive depression 105, which, being of a depth to accommodate the extent of the plunger-stud 91, affords an open field for the movement of the plunger-stud as it accompanies the locking-block on its downward and rearward movements. The first movement of the locking-block from the position shown in Fig. XVIII to that shown in Fig. XXI is downwardly, the locking-block being swung upon the pintle 65, as already specified. The plunger-stud 91 is accommodated to this movement by the forward curved wall 106 of the recess 105. Adjacent to the wall 106 a channel is defined by the sear 107, that is pivoted, as indicated at 108, to the side plate 60, and is provided (see also Fig. X) with an externally-defined slightly-oblique groove 109, its bifurcated end 110 being substantially flush with the upper or pivoted portion of the sear. The pivot 108 is located to one side of the main body of the sear, so that the sear drops normally under gravity below the lower edge 111 of the ejecting-aperture 62. The outer wall of the groove 109 works in a recess 112, formed in the side plate 60 in the bottom of the recess 105, and the movement of the sear upon its pivot 108 is circumscribed by the walls of the recess 112. A recess 113 extends flush with the bottom of the recess 105 to the lower edge of the plate 60 and admits the bulbous head 114 of the trigger 115, that is pivoted, as indicated at 116, within an aperture 117 in the lower wall of the frame 1 to engage with the bifurcated end 110 of the sear. The trigger is protected by the usual guard 118.

The details of the trigger are shown in Fig. XI, and its connection and relation to the sear are clearly illustrated in Figs. XXI to XXIII, as well as upon other figures of the drawings.

The curved face 119 of the sear is almost concentric with the curved wall 106 of the recess 105, so that as the locking-block in its initial downward movement, as shown in Fig. XXI, carries the plunger-stud 91 with it it guides it between the walls 106 and 119 of the recess 105 and the sear, respectively, and the groove 109 of the sear. The further downward and rearward movement of the locking-block, as indicated in dotted lines in Fig. XXI, causes the stud 91 to enter the groove 109 in the sear. The groove being inclined, the sear is slightly turned upon its pivot 108, as indicated in Fig. XXI. After the plunger-stud clears the groove 109 the sear again drops by gravity substantially to the position shown in Fig. XXV. Consequently when the locking-block upon its return movement advances from the position shown in full lines in Fig. XXIII to the position shown in dotted lines therein the plunger-stud 91 strikes the sear, as shown in Fig. XXIII, above the groove 109, impinging against the face 120 of the sear. Under the impulse of the stud 91 the sear tilts slightly upon its pivot, but detains the stud, the latter rising against its face as the locking-block is forced into position until, when it reaches the position shown in Fig. IV, the stud 91 is forced back to the end of the slot 90 in the locking-block and is held in that position through engagement with the upper end of the face 120 of the sear, as clearly indicated in dotted lines in Fig. IV. In that position the gun is cocked ready for firing. A pull upon the trigger tilts the head 114, which, engaging with the bifurcated end 110 of the sear, causes the sear to turn slightly upon its pivot, thereby depressing the end of the face 120 from the path of the stud 91 and releasing the spring 88. It may be noted here that the interior of the side plate 60, as shown in Fig. XXV, is provided with a groove 121, which permits the free rearward movement of the breech-block 63 without interfering with the laterally-projecting hook 95 upon the block. That is merely a detail of construction adapted to accommodate the particular form of block employed.

In Figs. XXVII and XXVIII a slightly-modified construction of side plate is illustrated. Although the contour of the side plate is the same as that of the side plate 60, yet for the purpose of distinction I shall indicate the side plate shown in that figure by the reference-numeral 122. The side plate 122 is provided with an endless groove, which consists of the nearly-vertical portion 123, the rearwardly-inclined portion 124, the obliquely-ascending portion 125, the vertically-ascending portion 126, and the horizontal portion 127. The plate 122 is recessed at right angles to the part 127 of the groove to carry a sliding sear 128, which reciprocates within fixed limits imposed by the engagement of the pin 130, projecting from the plate, with the ends of the longitudinal slot 129 in the sear. The sliding sear 128 is cut away in its lower part below a shoulder 132, so that its face, below said shoulder, shall be flush with the bottom of the groove 124 in order to permit the free travel through the groove 124 of the plunger-stud 91. The lower end of the sliding sear 128 is provided with a pair of laterally-projecting jaws 133, which receive between them the arm 134 of a trigger 135, which is of general bell-crank construction and is pivoted, as indicated at 136, within an aperture 137 in the frame 1. A spring 138 serves to normally support the trigger in position to hold the sliding sear 128 at the upper limit of its movement.

The purpose of the side plate 122, with its endless groove and sliding sear, is as follows: The locking-block, operating as previously described, carries the plunger-stud 91 downwardly in its first movement through the portion 123 of the endless groove. Thence it is guided by the groove 124 beyond the point of juncture of that groove with the groove 125. The locking-block pursues in its downward and rearward descent a course defined by the direct pull upon the link 71. This may be called its "normal" course; but its movement may be somewhat modified if another guiding force be interposed. The groove 124 performs the office of changing the normal course of the locking-block in its downward and rearward movement. The groove 125 is located so as to be in substantial alinement with the plunger-stud 91 when the locking-block is pursuing its normal course. Consequently after the stud 91 leaves the groove 124 and enters the enlarged space 139 at the juncture of the grooves 124 and 125 the stud 91, upon the return or ascending movement of the locking-block, follows the course of the groove 125, which guides it through the groove 126. When the stud reaches the top of the groove 126, the locking-block, as shown in dotted lines in Fig. XXVII, is then in place behind the cartridge and in position for firing. When the stud 91 enters the groove 127 from the groove 126, its movement is arrested by the upwardly-projecting end of the sliding sear 128, as clearly indicated in dotted lines in the figure last referred to. In that position a pull upon the trigger serves to draw the sliding sear 128 downwardly from in front of the stud 91 and, releasing it, to allow the plunger to slip forward under the impulse of the spring 88 to fire the gun.

As shown in Fig. XXVIII, the stud 91 is a cylindrical pin instead of rectangular, as shown in the other figures; but this is a mere mechanical variation. The groove 121 is also shown as omitted from the side plate 122; but that groove, as above explained, is merely employed to accommodate a particular form of construction of the breech-block and is not essential to the side plate proper.

Although my gun has been described as belonging properly to the type of magazine-guns, yet it is a desirable feature in guns of that class that they should include means for introducing a single shell from time to time, as required, and my gun, as above specified, is adapted to be used as a single-fire gun by inserting a cartridge through the ejecting-aperture 62. I nevertheless contemplate the employment of magazine feed mechanism for conveying cartridges from the magazine-chamber to the breech-chamber in the barrel.

In the preferred form of embodiment of my invention, as illustrated, the magazine-chamber is located in the stock and communicates with the breech-chamber through a deflected, preferably laterally-deflected, passage. It will have been understood, however, from the brief description already given of the operation of the feed-slide 35 and the cartridge-carrier section secured thereto that the feed-slide may operate to extract a cartridge from the magazine-chamber and present it in front of the breech-block at whatever point upon the gun the magazine-chamber may be located. In other words, while I prefer the entire construction as illustrated I do not wish to limit the scope of my invention to any particular location of the magazine-chamber or to the operation of the feed-slide with respect to any such particular location of the magazine-chamber.

As previously specified, the means of communication from the cartridge-chamber defined by the recesses 22 and 23 is through a continuous cartridge-passage extending from an aperture in the butt-plate 11 into and through the channel 58 in the side of the frame 1.

Within grooves 45 in the two parts of the stock travels the cartridge-carrier section of the feed-slide. The cartridge-carrier section is provided with mechanism for feeding the cartridges one by one from the magazine-chamber through that portion of the passage defined by the deflecting-plate 56 and for advancing the foremost cartridge into the channel 58, after reaching which the cartridges are advanced and delivered into the chamber by mechanism carried upon the locking-block.

To adapt it to the performance of the functions recited, the cartridge-carrier section 40 is provided at intervals of required distance with yielding supports or feeders 140. They preferably consist of spring-metal plates provided with bent angular heads 141, the plates being secured at one end, as at 142, (see Fig. XII,) to the under side of the cartridge-carrier and the heads working through longitudinal slots 143 in the body thereof. As illustrated, two heads are shown, their office being to advance the cartridge E into the position of the cartridge D (see particularly Figs. XV and XVII) and cartridge F into the position vacated by cartridge E. To accomplish this object, the carrier 40 is, through the manipulation of the hand-grip 52, forced to or nearly to the rearward limit of movement shown in Fig. VII, in which the lowest of the series of cartridges X contained within the magazine-chamber slips in front of the rearward feeder, thereby assuming the position of the cartridge F, with the point of its ball resting upon the forward feeder. If now the hand-grip 52 be advanced to the position shown in Figs. IV and VI, the cartridge F will be carried into the position of the cartridge E and another of the series of cartridges X will take the place of the cartridge F. At the same time the forward feeder will urge the cartridge ahead of it into the position of the cartridge D. (See Fig. XVII.) To secure a further advance of the respective cartridges, the reciprocatory movement of the cartridge-carrier 40 must be repeated, and so on from time to time until the cartridges in the magazine-chamber are exhausted, after which of course continued reciprocation of the carrier 40 will advance the last cartridge F through the successive positions.

In order to prevent the backward movement of cartridges D and E, it is necessary to provide means for holding them in the positions represented by those letters, and for that purpose I provide yielding detents 145 146, respectively, secured within the stock—as, for example, to the side piece 7 within the recesses 147 and 148, respectively. The heads 149 and 150 of the yielding detents correspond substantially to the shape of the heads of the feeders 140 and are located in adjacent positions to them when the carrier 40 is at its forward limit of movement, as shown in Fig. XVII. It will be understood from the foregoing description, by reference to the drawings, that the cartridges are successively impelled through the cartridge-passage by the feeders 140, the detents 146 145, respectively, yielding to permit them to pass. On the other hand, the cartridges being in position, when the carrier 40 is forced to the rear the heads of the respective detents hold the cartridges, while the head of the forward feeder 140 yields to permit the backward movement of the carrier. I also provide a terminal yielding detent 151, that is secured, as indicated at 152, to the upper wall of the extremity of the cartridge-passage and whose curved head works in a recess 153 therein. The office of the terminal detent is to guide the cartridges of the series X successively into the position of the cartridge F. It also serves, as illustrated in Fig. XIV, to assist the rearward feeder 140 in filling the magazine-chamber in the act of loading. In that operation the point of the cartridge is first elevated by the feeder, as shown in dotted lines in Fig. XIV, and when the next cartridge is introduced the feeder is compressed, so that when the heel of the cartridge passes the terminal detent the cartridge is delivered well into the magazine-chamber against the bent arm of the spring 26. Assume now that the cartridge-passage contains at least the cartridge D, the mechanism being in the position shown in Figs. IV, VI, and XVII, for example, and that the cartridge-carrier is then shifted to the rearward position, as shown in Fig. VII, for instance. In that movement of the carrier the detent 145 restrains the rearward movement of the cartridge D and holds it in position. When the next forward movement of the carrier is made, a yielding feeder 155, carried upon a lateral extension 156 at the forward end of the cartridge-carrier, (see Fig. XII,) impinges against the base of cartridge D and advances it under the deflecting-plate 56 into the channel 58 to the position C, in which position, as clearly shown in Fig. XVIII, the heel of the cartridge is introduced just within the lower end of the channel 58. In advancing the cartridge D to position C the feeder 155 depresses a spring-detent 157, (see Figs. IV and V,) which as the cartridge slips into position C holds it in place against the backward movement of the carrier 40. After the cartridge reaches the position C it ceases to be operated upon by the feed-slide, but is thenceforward actuated by mechanism directly connected with the locking-block. The means employed for advancing the cartridge C to position B is a swinging feeder 160, pivoted, as indicated at 161, within a recess 162 in the side of the locking-block next to the channel 58. (See Fig. VI.) The swinging feeder 160 at its free end carries a small stud-pin 163, (clearly shown in Figs. XV and XVII,) which, impinging against the heel of the cartridge C, the feeder 160 swinging with the movement of the locking-block to hold it in that position behind the cartridge, forces the cartridge into position B. Compare Figs. XV and XVII, in which the two positions are illustrated. The movements of the swinging feeder 160 are clearly illustrated in dotted lines in Fig. XX of the drawings. As appears particularly in that figure, the opposing edges 164 and 165, that define the interior open portion of the channel 58, (compare also Figs. XXII and XXIV,) engage alternately the stud-pin 163 (the pin being urged into engagement therewith by the curvature and resiliency of the swinging feeder, as indicated in Fig. XV of the drawings) and guide the stud-pin in the rearward and forward movement of the locking-block into engagement with the heel of a cartridge lying in its path—that is to say, the cartridge C.

As is clearly illustrated in Figs. XV and XVII of the drawings, the point of the cartridge C is supported upon a yielding detent 166, whose rear end is secured, as indicated at 167, to the interior of the side wall of the channel 58 and whose free end is curved inwardly, as shown. The detent 166 is swept aside by the forward movement of the cartridge C while it is being impelled by the swinging feeder 160; but when the cartridge completes its forward movement and reaches the position marked B the detent 166 rises behind it and holds it in place. When advanced to the position B in the movement described immediately above, the cartridge is presented to a yielding delivering-sheath 168, that is secured, as indicated at 169, to the inner wall of the channel 58, and whose free end is provided with a retaining member 170, designed to guide the cartridge B into the breech-chamber. The retaining member 170 holds the cartridge loosely, after the manner in which it would be held in the palm of the hand, the resiliency of the metal of which the sheath is composed being sufficient to elevate the point of the cartridge substantially in axial alinement with the breech-chamber. The inner edge 171 of the retaining member 170 is smooth and curved and is designed to make contact with the wall of the locking-block in such a manner that the locking-block may move freely and uninterruptedly over it, depressing it into the forward recess 172 of the chamber 58 when the locking-block is advanced to the firing position, as shown in Fig. XVII, or relieving it and allowing it to rise to the position shown in Fig. XV when the locking-block is retracted.

The locking-block carries upon the shorter leg of its bifurcated end 66 a yielding feeder 174, (compare Figs. VIII and XV,) that is compressible within a recess 175 in the end of the locking-block. (Clearly indicated in Fig. XV.) The feeder 174 yieldingly passes over the heel of cartridge B as the locking-block passes toward the position indicated in Fig. XV. When reaching that position, it springs in behind the cartridge, as shown in that figure, and with the return movement of the locking-block assists the breech-block to drive the cartridge into the chamber, as clearly illustrated in Fig. XXIII of the drawings. The cartridge in that figure is lettered B, it being shown in the act of passing from position B to position A within the breech-chamber.

An important feature of my invention in this connection consists in the provision made for deflecting the point of each cartridge in the cartridge-passage from the fulminate-cap of the one in front of it. The several feeders and detents serve to perform that office. The points of the cartridges are deflected, some laterally and some of them vertically; but an examination of the different positions, as illustrated, of the several cartridges will serve to explain my object. The rearward feeder 140 and the detent 146 coöperate to deflect the point of cartridge F from the cap of cartridge E. In like manner the forward feeder 140 and the detent 145 deflect the point of cartridge E from the cap of cartridge D. Detent 157 and feeder 155 deflect the point of the cartridge D from the cap of the cartridge C. (Compare Fig. XVII with Figs. IV and V.) Detent 166 coöperates with the swinging feeder 160 to deflect point of the cartridge C from the cap of the cartridge B.

The object of deflecting the point of each cartridge from the cap of its advance neighbor is to prevent possibility of accidental explosion of cartridges within the magazine through shock or jar derivable, for instance, from the recoil of the gun. The point of the cartridge B is always confined within the chamber 172 of the channel 58 when the locking-block and breech-block are in place and can never come into line with the cap of the cartridge A except when the cap of the cartridge A is exploded or the parts of the gun are in the inoperative position.

In Figs. XXIX to XXXI of the drawings I illustrate a form of embodiment of my invention, the object of which is to change the position of the trigger of the gun, locating it nearer the central part of the grip instead of directly under the frame.

Referring to those figures, 176 indicates a modified locking-block substantially identical in all respects with the locking-block 68, both as to form and manner of operation, except that instead of a plunger it contains an intermediate firing-pin 177, which communicates at its forward end with the firing-pin 85 and is actuated from the rear by a plunger 178, which travels in an obliquely-disposed guideway 179 in a thickened portion or housing 180 of the frame, deriving its impulse from a coiled spring 181, corresponding in function to the spring 88, previously described. The locking-block 176 carries upon one side a stud-pin 182, that works in a groove in the side plate 183. The groove consists of a vertically-inclined section 184, an obliquely-inclined section 185, extending parallel to the guideway 179, a deflecting-section 186, and a tail-guide section 187. Within a recess 188, that extends under the deflecting-section 186 of the groove, is pivotally mounted, as indicated at 189, a sear 190. The sear is provided with a detaining-arm 191 and a bifurcated arm 192. The latter engages with the trigger 193, identical in form with the trigger 115, previously specified. The round upper corner 194 of the locking-block 176 is designed to impinge against the plunger-stud 195, which projects from the plunger 178 through a slot 196 in the housing 180. This it is compelled to do while the pin 182 moves in the section 185 of the groove in the side plate. Consequently the rearward movement of the locking-block during the engagement of the stud 182 with the section 185 of the side plate tends to drive the plunger 178 rearwardly and to compress the spring 181. When, however, the spring is sufficiently compressed, the plunger-stud 195 is driven beyond the detaining-arm 191 of the sear, which by gravity or other acting force, as may be preferred, rises in front of the plunger-stud. The oscillation of the sear being limited by the side walls of the recess 188, the sear is adapted to intercept the plunger 195 and prevent, so long as it is interposed, its forward movement. At about the same time as the plunger-stud is forced to the rear of the detaining-arm 191 of the sear the plunger-stud 182 is guided downwardly by the deflecting-section 186 of the groove and compelled to enter the groove 187 of the side plate and retire from in front of the plunger-stud 195, leaving it resting solely against the detaining-arm 191 of the sear. In the returning movement of the locking-block the curved end 194 of the locking-block passes freely under the plunger-stud 195, permitting the locking-block to be restored to the firing position, whereupon the piece is ready to fire through a pull upon the trigger 193 in the usual manner. The pull upon the trigger tilts the sear upon its axis 189 and releases the plunger-stud 195. The plunger advances under the force of the spring 181, and, striking the end of the intermediate firing-pin 177, communicates the force of the blow through the firing-pin 85 to the cap of the cartridge.

In Figs. XXXII to XXXIV, inclusive, I illustrate a form of magazine-chamber which may be called in this connection an "auxiliary magazine" or "cartridge-chamber" 198. It is designed to carry an auxiliary supply of cartridges, which may be supplied to the cartridge-feed mechanism after the supply in the primary magazine-chamber is exhausted. In order to accommodate it to this office, I provide in its lower part cartridge-supporting mechanism, which consists of a rotatable disk 199, connected, as by links 200, with supports 201, that work in slots 202 in the side walls of the chamber. The disk is mounted upon a spindle 203, which may be actuated by an arm 204, that fits snugly within a recess provided for it upon the outside of the stock. A retaining-pin 205 may be employed for holding the arm in place.

In the form of stock illustrated in Figs. XXXII to XXXIV, inclusive, the cartridges may be supplied to the primary and auxiliary chambers through hinged doors 206 and 207, for example.

In the foregoing description I have from time to time pointed out the mode of operation of the several elements and groups of elements and now subjoin a brief description of the general operation of my gun.

In loading the magazine-chamber the hand-grip 52 is brought to the position shown in Fig. XIV, in which position the rearward feeder 140 and the terminal detent 151 are located so as to force the cartridges into the magazine-chamber as they are pushed into the cartridge-passage through the feed-aperture 12 in the butt-plate. When the magazine-chamber is filled, or before, the hand-grip is forced to the limit of its backward movement, (see Fig. VII,) in which position the cartridges forced in through the aperture 12 are pressed down against the carrier-section 40 of the feed-slide and may be advanced over the yielding detents and feeders by the introduction, successively, of a fresh cartridge from the rear. The cartridge-passage and magazine-chamber may, in the first place, be both filled with cartridges, although that is not necessary to the operation of my gun, inasmuch as one cartridge supplied in front of the rearward feeder 140 will be carried forward through the cartridge-passage into the breech-chamber whether others are present in the passage or not. Assuming that the cartridge-passage and the magazine-chamber are supplied with cartridges, the alternate backward and forward reciprocation of the hand-grip 52 will suffice to run the entire supply of cartridges through the gun. With each backward reciprocation of the hand-grip a cartridge from the breech-chamber, if it contains one, or a shell, if the cartridge has been exploded, will be ejected, as illustrated in Fig. XXVI, from the ejecting-aperture 62. With each forward movement of the hand-grip 52, as long as the recess 172 of the chamber 58 contains a cartridge, the breech-chamber will be supplied, and the gun may be fired by pulling upon the trigger. The piece, however, may be fired with safety and with great rapidity by retaining a constant hold upon the trigger, so that the locking-block 68 is forced into place and the plunger 87 is driven forward simultaneously. It will be understood from an examination of Fig. XXIII, for instance, how this may be accomplished with safety. In that figure in dotted lines it appears that the plunger-stud 91 engages low down upon the face 120 of the sear and slides along the face 120 while the locking-block is being driven into the firing position. The movement of the sear is limited in such manner by the walls of its recess 112 (see Fig. XXV) that it cannot release the plunger-stud 91 until at the precise moment when the locking-block is forced into the firing position and secured there by the interposition between it and the frame of the link 71.

While I have illustrated and described in detail a preferred form of embodiment of my invention and have pointed out certain special modifications, yet I consider that the form of embodiment illustrated and described is susceptible, within the scope of my invention, of various modifications not pointed out in detail, and wishing to enjoy to the fullest extent the right to substitute equivalent mechanism where I may hereafter desire to employ it have endeavored in describing the elements, of which one of a variety of forms has been selected, to indicate the choice or preference by the language employed in the description of the parts.

What I claim is—

1. In a firearm, the combination with a gun frame, barrel, and stock, of a cartridge-passage communicating between the gun-barrel and the stock, a cartridge-feed mechanism, a reciprocating breech-block working within the gun-frame, a locking-block movably secured to the breech-block, and an actuating connection between the cartridge-feed mechanism and the locking-block, arranged to lock the block in place when in firing position, substantially as set forth.

2. In a firearm, the combination, with a gun frame, barrel, and stock, of a cartridge-passage communicating between the gun-barrel and the stock, a cartridge-feed mechanism, a reciprocating breech-block working within the gun-frame, a locking-block movably secured to the breech-block, and a folding connection between the locking-block and the feed mechanism, whereby the block, when moved from its firing position, may be folded down close to the feed mechanism, within the gun-frame, substantially as and for the purpose set forth.

3. In a firearm, the combination with a frame, barrel, stock having a cartridge-passage therein, and a cartridge-passage between the stock and barrel, of a reciprocatory feed-slide for advancing the cartridges from the stock, a reciprocatory breech-block working within the gun-frame in rear of the barrel, a locking-block secured to the breech-block and movable out of line with the barrel, to a position within the gun-frame, and a folding connection between the locking-block and the feed-slide, substantially as set forth.

4. In a gun, the combination with a frame, barrel, and stock, of a laterally-disposed passage for the cartridges between the stock and barrel, a feed mechanism provided with means extending into the passage and which act upon the cartridges while within such laterally-disposed passage to advance them through it, a reciprocatory breech-block working within the frame in the rear of the barrel, means for actuating the breech-block, and means for actuating the feed mechanism, substantially as set forth.

5. In a gun, the combination with a frame, barrel, stock, and cartridge chamber or passage within the stock, of a laterally-disposed passage establishing communication between the magazine-chamber and the barrel, a feed-slide provided with means for advancing cartridges through the passage, a reciprocatory breech-block working within the frame in the rear of the barrel, and means for actuating the breech-block connected with the feed-slide, substantially as set forth.

6. In a firearm, the combination with a frame, barrel, stock, and cartridge-passage within the stock and frame communicating with the barrel, of a feed-slide provided with means for advancing cartridges through the passage, a locking-block also provided with means for advancing cartridges through the passage, and means for actuating the locking-block and feed-slide, respectively, substantially as set forth.

7. In a firearm, the combination with a frame, and section of cartridge-passage within the frame, of a breech-block and locking-block movably secured thereto, means upon the locking-block for advancing a cartridge within the passage to a position in front of the breech-block, and mechanism for actuating the locking-block, substantially as set forth.

8. In a firearm, the combination with a frame, stock, and cartridge-passage partially within the frame and partially within the stock, of a feed-slide provided with means for actuating a cartridge through the passage within the stock, a locking-block provided with means for actuating the cartridge through the passage within the frame to a position in front of the breech-block, and means for actuating the feed-slide and locking-block, respectively, substantially as set forth.

9. In a gun, the combination with a frame adapted to be secured at one end to a barrel, and at the other end to a stock, of a movable breech-block within the frame, a locking-block movably secured to the breech-block, means for operating the locking-block, and a connection between said means and the locking-block provided with engaging parts which are brought into supporting contact with the frame at the final closing movement of the parts, substantially as set forth.

10. In a firearm, the combination with a frame adapted to be secured at one end to a barrel, and at the other end to a stock, of a movable breech-block within the frame, a locking-block movably secured to the breech-block, a feed-slide working in the frame, a link pivotally connected at one end to the locking-block, and at the other end to the feed-slide, means of direct contact between the link and the locking-block at one end, and through the feed-slide with the frame at the other, and mechanism adapted to actuate the feed-slide, and to interpose the link vertically between the frame and the locking-block, substantially as set forth.

11. The combination with a gun-frame, an abutment-face on the forward end thereof, of a reciprocatory breech-block within the frame, a locking-block pivotally secured to the breech-block, a fulcrum extension upon the locking-block adapted to bear against the abutment-face upon the frame, to start the breech-block, and means for actuating the locking-block, substantially as set forth.

12. In a firearm, the combination with a reciprocatory breech-block, and mechanism for actuating it, of a firing-pin movable within the breech-block and having an extension which works in a longitudinal groove in the gun-frame, and a stop-shoulder against which said extension strikes for intercepting the rearward movement of the firing-pin, substantially as set forth.

13. In a firearm, the combination with a reciprocatory breech-block, of a spring-hook carried thereby and adapted to engage the heel of a cartridge, a stop located at one side of the path of said block, and a firing-pin movably mounted in said breech-block and extended so as to engage with said stop when the block is drawn backward, substantially as and for the purpose described.

14. In a firearm, the combination with a gun-frame having one of its sides provided with a groove or depression, of a movable locking-block mounted within the gun-frame, means for actuating the block, a spring-actuated plunger within the block having a lateral projection which enters the said groove or depression, a sear also extending within the said groove or depression for engaging with said projection, and a trigger operatively connected with the sear, substantially as set forth.

15. In a firearm, the combination with a breech-block, and a relatively movable firing-pin carried thereby, of a locking-block connected to the breech-block, means for actuating said blocks, a spring-actuated plunger mounted in the locking-block, a sear for engaging said plunger, and a trigger operatively connected to said sear, substantially as described.

16. In a firearm, the combination with a movable breech-block, of a locking-block connected thereto, means for actuating said blocks, a plunger mounted in the locking-block, and provision for holding the plunger back as the locking-block is advanced, substantially as described.

17. In a firearm, the combination with a movable breech-block, of a locking-block connected thereto, means for actuating said blocks, a plunger mounted in the locking-block, and means operative by the trigger for holding and releasing said plunger, substantially as described.

18. In a firearm, the combination with a gun-frame, and movable sear, a movable plunger-containing member, plunger and spring, and means for giving to the plunger-containing element irregular movements, whereby in traveling in one direction it is caused to take one path, and when traveling in the other direction, another path of intermittently-operative connecting mechanism uniting the plunger and sear, whereby the plunger is caught by the sear in its movement in one direction and not in the other, substantially as set forth.

19. In a firearm, the combination with a gun-frame having one of its sides provided with a groove or depression, of a sear extending within such groove or depression, a trigger operatively connected therewith, a movable plunger-containing element mounted within the gun-frame, a plunger and spring within such element, the plunger being provided with a projection which extends into said groove or depression, and is adapted to engage with the sear, and means for giving to the plunger-containing element irregular movements, whereby when it is moved in one direction it is caused to take one path, and when moved in the opposite direction to take another path, substantially as set forth.

20. In a firearm, the combination with a gun-frame, movable sear, and movable element, for example, a locking-block, working within the frame, of a groove in the sear, and in the frame, respectively, and a stud upon the movable element working within the groove in the frame and sear, respectively, substantially as and for the purpose specified.

21. In a firearm, the combination with a gun-frame, and movable sear, provided with a plunger-stud-engaging face, of a movable breech-block within the frame, a locking-block movably secured thereto, a plunger and plunger-spring within the locking-block, and a plunger-stud adapted to engage and ride upon the face of the sear during the movement of the locking-block to the firing position, substantially as set forth.

22. In a firearm, the combination of a gun-frame provided with a groove having a plurality of guiding edges or surfaces, a reciprocatory breech-block, a locking-block movably secured thereto, and carrying a projecting stud which extends into the aforesaid groove, whereby when the locking-block is moved in one direction it is directed in one course, and when moved in the opposite direction is directed in a different course, a reciprocatory hand-grip, and connections between the said hand-grip and the said blocks, substantially as set forth.

23. In a firearm, the combination of a gun-frame provided with a groove, a reciprocating breech-block, a locking-block movably secured thereto, and carrying a laterally-projecting stud working in said groove, a reciprocating hand-grip mounted on the barrel, a feed-slide connected thereto, and a link interposed between the feed-slide and locking-block, substantially as described.

24. In a firearm, the combination with a gun-frame provided in its inner wall with a groove, of a movable breech-block, a locking-block connected thereto, locking-block-actuating mechanism, a reciprocatory plunger within the locking-block, and a stud on the plunger working in the groove in the gun-frame, substantially as and for the purpose described.

25. In a firearm, a gun-frame provided in its inner wall with a groove for the sear, in combination with a movable sear mounted therein, a movable breech-block, a locking-block connected thereto, a plunger reciprocating in the locking-block, a stud on the plunger for engagement with the sear, and a trigger having engagement with said sear and adapted to move the latter into and out of the path of the plunger-stud, substantially as described.

26. A breech-loading firearm having one or more cartridge-compartments in its stock, in combination with a longitudinally-extended magazine located at one side of the center of the gun, said magazine converging at its ends toward the gun-barrel and the said cartridge-compartments, respectively, a feed-slide for advancing the cartridges through the magazine, a reciprocating breech-block, a locking-block pivotally connected thereto, and a link connecting said locking-block and feed-slide, substantially as described.

27. In a firearm, a longitudinal magazine deflected to one side, in combination with a feed-slide having parts widened to correspond with the deflected part of the magazine and provided with feeders at intervals in its links and means for actuating the feed-slide, substantially as described.

28. In a firearm, a longitudinal magazine deflected to one side in combination with a flexible feed-slide deflected in its length, and having widened parts, spring-feeders at intervals in the length of the feed-slide, and located out of line to correspond with the deflected part of the magazine, and means for actuating the feed-slide, substantially as described.

29. In a firearm, the combination with a laterally-deflected magazine, of a feed-slide provided with feeders located at different intervals, and arranged out of longitudinal alinement corresponding to the lateral curvature of the magazine, substantially as described.

30. In a firearm, the combination with a frame, stock and barrel, of a cartridge-passage within the frame and stock having a deflected portion, a feed-slide, feed-slide-actuating mechanism, and a laterally-disposed feeder upon the slide adapted to feed a cartridge through the deflected part of the passage from the stock to the frame, substantially as set forth.

31. In a magazine repeating-gun, the combination with a cartridge-passage, and feed mechanism coöperating therewith to advance a series of cartridges through the same, of cartridge-point-deflecting mechanism adapted to deflect the point of each cartridge from the cap of its advance neighbor, comprising yielding detents which bear upon the cartridges as they pass through the passage, substantially as set forth.

32. In a firearm, the combination with a gun-frame, movable breech-block and locking-block movably secured thereto, of a cartridge-passage in the frame arranged at the side of the said block, and a yielding feeder upon the forward end of the locking-block, moving in the line of the passage and adapted to advance a cartridge from the passage, substantially as set forth.

33. In a firearm, the combination with a laterally-deflected magazine, of a reciprocating feed-slide provided with spring-feeders located at different intervals and arranged out of longitudinal alinement corresponding to the lateral curvature of the magazine, and spring-detents arranged in corresponding order for preventing the backward movement of the cartridges, substantially as described.

34. A firearm containing a cartridge-chamber for holding a supply of cartridges, in combination with a support for confining the cartridges in said chamber, means for moving said support from beneath the cartridges, and mechanism for feeding the cartridges, substantially as described.

35. A firearm having a chamber for containing a supply of cartridges, in combination with a pair of supports, arranged at the discharge of said chamber, means for simultaneously operating said supports from beneath the cartridges, and suitable feeding mechanism, substantially as and for the purpose described.

36. A firearm having a chamber for containing a supply of cartridges, in combination with spaced supports for confining the cartridges therein, a rotatable disk, arms or links interposed between said disk and the supports, an arm on the spindle of the disk for turning the latter, and means for engaging and holding said arm, substantially as described.

In testimony of all which I have hereunto subscribed my name.

ROBERT DINSMORE.

Witnesses:
CHARLES B. DUNN,
ALBERT B. CROUNSE.